United States Patent [19]

Bowes et al.

[11] 4,305,808

[45] Dec. 15, 1981

[54] CATALYTIC HYDROCRACKING

[75] Inventors: Emmerson Bowes, Pilesgrove Township, Salem County; Allan W. Peters, Moorestown, both of N.J.

[73] Assignee: Mobil Oil Corporation, New York, N.Y.

[21] Appl. No.: 139,922

[22] Filed: Apr. 14, 1980

[30] Foreign Application Priority Data

Apr. 6, 1977 [GB] United Kingdom ................ 1469345
Feb. 27, 1980 [GB] United Kingdom ................ 2027742

[51] Int. Cl.³ ............................................. C10G 47/20
[52] U.S. Cl. .............................. 208/111; 208/DIG. 2; 252/455 Z
[58] Field of Search ......................... 208/111, DIG. 2

[56] References Cited

U.S. PATENT DOCUMENTS

| | | | |
|---|---|---|---|
| 3,700,585 | 10/1972 | Chen et al. | 208/111 |
| 3,702,886 | 11/1972 | Argauer et al. | 208/111 |
| 3,788,974 | 1/1974 | Buchmann et al. | 208/59 |
| 3,830,724 | 8/1974 | Schutt | 208/111 |
| 3,968,024 | 7/1976 | Gorring et al. | 208/111 |
| 3,970,544 | 7/1976 | Rosinski et al. | 208/111 |
| 4,229,282 | 10/1980 | Peters et al. | 208/111 |

*Primary Examiner*—Delbert E. Gantz
*Assistant Examiner*—G. E. Schmitkons
*Attorney, Agent, or Firm*—Charles A. Huggett; Michael G. Gilman; Dennis P. Santini

[57] ABSTRACT

Catalytic hydrocracking of polynuclear aromatic containing feedstocks is conducted over catalysts comprising zeolites in intimate contact with a nickel-tungsten hydrogenation component. Said zeolites are characterized by a silica to alumina mole ratio of at least 12, a constraint index within the approximate range of 1 to 12 and an alpha value of between about 25 and 200.

10 Claims, No Drawings

CATALYTIC HYDROCRACKING

BACKGROUND OF THE INVENTION

1. Field of the Invention

This invention relates to catalytic hydrocracking. More particularly, this invention is concerned with hydrocracking of polynuclear aromatic containing feedstocks with a catalyst exemplified by small crystal size ZSM-5 associated with nickel-tungsten.

2. Description of the Prior Art

The hydrocracking of hydrocarbons to produce lower boiling hydrocarbons, and in particular, hydrocarbons boiling in the motor fuel range, is an operation upon which a vast amount of time and effort has been spent in view of its commercial significance. Hydrocracking catalysts usually comprise a hydrogenation-dehydrogenation component deposited on an acidic support such as silica-alumina, silica-magnesia, silica-zirconia, alumina, acid treated clays, zeolites and the like.

Crystalline zeolites have been found to be particularly effective in the catalytic hydrocracking of a gas oil to produce motor fuels and such has been described in many U.S. patents including Nos. 3,140,249; 3,140,251; 3,140,252; 3,140,253; and 3,271,418.

A catalytic hydrocracking process utilizing a catalyst comprising a zeolite dispersed in a matrix of other components such as nickel, tungsten and silica-alumina is described in U.S. Pat. No. 3,617,498. A hydrocracking catalyst comprising a zeolite and a hydrogenation-dehydrogenation component such as nickel-tungsten-sulfide is recited in U.S. Pat. No. 4,001,106. In U.S. Pat. No. 3,758,402, a hydrocracking process is disclosed wherein the catalyst comprises a large pore zeolite such as zeolite X or Y and a smaller pore zeolite such as ZSM-5 which may have a hydrogenation/dehydrogenation component such as nickel-tungsten associated with at least one of the zeolites. Hydrocarbon conversion utilizing a catalyst comprising a zeolite, such as ZSM-5, having a zeolite particle diameter in the range of 0.005 micron to 0.1 micron and in some instances containing a hydrogenation/dehydrogenation component is related in U.S. Pat. No. 3,926,782. The hydrocracking of lube oil stocks employing a catalyst comprising hydrogenation components and a zeolite such as ZSM-5 is disclosed in U.S. Pat. No. 3,755,145.

Whereas a great amount of attention has been given to hydrocracking petroleum gas oils, much less emphasis has been devoted to hydrocracking polynuclear aromatic containing feedstocks such as FCC cycle oils and coal derived liquids. Such polynuclear aromatic stocks require saturation and thus increased hydrogen consumption during processing in order to produce a suitable liquid product. U.S. Pat. No. 3,523,886 discloses a process for making liquid fuel from coal by solvent extraction which involves catalytic hydrocracking.

Hydrocracking generally requires a clean feedstock, or alternatively, due to the large heteroatom content of many feedstocks, hydrocracking frequently must be preceded by a pretreatment stage. It would be very advantageous to have a system which would be able to both pretreat and hydrocrack in one operation.

SUMMARY OF THE INVENTION

It has now been discovered that catalytic hydrocracking of polynuclear aromatic containing feedstocks can advantageously be conducted by contacting said feedstocks and hydrogen under conversion conditions with a catalyst comprising a zeolite having an alpha value of between about 25 and 200 in intimate contact with a nickel-tungsten hydrogenation component. Said zeolite is characterized by a silica to alumina mole ratio of at least 12, a constraint index in the approximate range of 1 to 12.

Hydrocracking in accordance with this invention results in reducing the nitrogen content and the sulfur content of the feedstock, while increasing the hydrogen content and converting a substantial amount of the polynuclear aromatics to saturates, monoaromatics and gasoline. The nitrogen tolerance and cracking ability of the catalyst of the instant invention would allow its use as a cracking catalyst for very high nitrogen polyaromatic stocks with little or no pretreatment.

DESCRIPTION OF PREFERRED EMBODIMENTS

The catalyst useful in this invention comprises a crystalline zeolite having an alpha value of between about 25 and 200 in intimate contact with a nickel-tungsten hydrogenation component.

The crystalline zeolite is a member of a novel class of zeolites having a silica to alumina ratio of at least 12, and a Constraint Index in the approximate range of 1 to 12. The catalyst contains about 0.7 to about 7 wt. % nickel and about 2.1 to about 21 wt. % tungsten, expressed as metal, which functions as an hydrogenation component. The zeolite and hydrogenation component may be dispersed in a matrix such as alumina or clay. A particularly preferred zeolite is one having a crystallite size of less than about 5 microns.

The crystalline zeolites useful herein are members of a class of zeolites exhibiting some unusual properties. These zeolites induce profound transformation of aliphatic hydrocarbons to aromatic hydrocarbons in commercially desirable yields and are generally highly effective in conversion reactions involving aromatic hydrocarbons. Although they have unusually low alumina contents, i.e., high silica to alumina mole ratios, they are very active even when the silica to alumina mole ratio exceeds 30. The activity is surprising since catalyst activity is generally attributed to framework aluminum atoms and cations associated with these aluminum atoms. These zeolites retain their crystallinity for long periods in spite of the presence of steam at high temperature which induces irreversible collapse of the framework of other zeolites, e.g., of the X and A type.

An important characteristic of the crystal structure of this class of zeolites is that it provides constrained access to, and egress from the intracrystalline free space by virtue of having a pore dimension greater than about 5 Angstroms and pore windows of about a size such as would be provided by 10-membered rings of silicon atoms interconnected by oxygen. It is to be understood, of course, that these rings are those formed by the regular disposition of the tetrahedra making up the anionic framework of the crystalline zeolite, the oxygen atoms themselves being bonded to the silicon or aluminum atoms at the centers of the tetrahedra. Briefly, the preferred type zeolites useful in this invention possess, in combination: a silica to alumina mole ratio of at least about 12; and a structure providing constrained access to the intercrystalline free space.

The silica to alumina mole ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica to alumina mole ratio of at least 12 are useful, it is preferred to use zeolites having higher ratios of at least about 30 and in some instances of at least about 500. Such zeolites, after activation, acquire an intracrystalline sorption capacity for normal hexane which is greater than that for water, i.e., they exhibit "hydrophobic" properties. It is believed that this hydrophobic character is advantageous in the present invention.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering or pore blockage may render these zeolites ineffective. Twelve-membered rings do not generally appear to offer sufficient constraint to produce the advantageous conversions, although puckered structures exist such as TMA offretite which is a known effective zeolite. Also, structures can be conceived, due to pore blockage or other cause, that may be operative.

Rather than attempt to judge from crystal structure whether or not a zeolite possesses the necessary constrained access, a simple determination of the "constraint index" may be made by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 540° C. (1000° F.) for at least 15 minutes. The zeolite is then flushed with helium and the temperature adjusted between 290° C. (550° F.) and 510° C. (950° F.) to give an overall conversion between 10% and 60%. The mixture of hydrocarbons is passed at a 1 liquid hourly space velocity (i.e., 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10} (\text{fraction of n-hexane remaining})}{\log_{10} (\text{fraction of 3-methylpentane remaining})}$$

The constraint index approximates the ratio of the cracking rate constants for the two hydrocarbons. Zeolites suitable for the present invention are those having a constraint index in the approximate range of 1 to 12. Constraint Index (CI) values for some typical zeolites are:

| ZEOLITE | C.I. |
|---|---|
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| Clinoptilolite | 3.4 |
| TMA Offretite | 3.7 |
| Beta | 0.6 |
| ZSM-4 | 0.5 |
| H-Zeolon | 0.4 |
| REY | 0.4 |
| Amorphous Silica-Alumina (non-zeolite) | 0.6 |
| Erionite | 38 |

It is to be realized that the above constraint index values typically characterize the specified zeolites but that such are the cumulative result of several variables used in determination and calculation thereof. Thus, for a given zeolite depending on the temperature employed within the aforenoted range of 290° C. (550° F.) to 510° C. (950° F.), with accompanying conversion between 10% and 60%, the constraint index may vary within the indicated approximate range of 1 to 12. Likewise, other variables such as the crystal size of the zeolite, the presence of possible occluded contaminants and binders intimately combined with the zeolite may affect the constraint index. It will accordingly be understood by those skilled in the art that the constraint index, as utilized herein, while affording a highly useful means for characterizing the zeolites of interest is approximate, taking into consideration the manner of its determination; with probability, in some instances, of compounding variable extremes.

While the above experimental procedures will enable one to achieve the desired overall conversion of 10 to 60% for most catalyst samples and represents preferred conditions, it may occasionally be necessary to use somewhat more severe conditions for samples of very low activity, such as those having a very high silica to alumina mole ratio. In those instances, a temperature of up to about 540° C. (1000° F.) and a liquid hourly space velocity of less than one, such as 0.1 or less, can be employed in order to achieve a minimum total conversion of about 10%.

The class of zeolites defined herein is exemplified by ZSM-5, ZSM-11, ZSM-12, ZSM-23, ZSM-35 and ZSM-38 and other similar materials. U.S. Pat. No. 3,702,886 describing and claiming ZSM-5 is incorporated herein by reference.

ZSM-11 is more particularly described in U.S. Pat. No. 3,709,979, the entire contents of which is incorporated herein by reference.

ZSM-12 is more particularly described in U.S. Pat. No. 3,832,449, the entire contents of which is incorporated herein by reference.

ZSM-23 is more particularly described in U.S. Pat. No. 4,076,842, the entire contents of which is incorporated herein by reference.

ZSM-35 is more particularly described in U.S. Pat. No. 4,016,245, the entire contents of which is incorporated herein by reference.

ZSM-38 is more particularly described in U.S. Pat. No. 4,046,859, the entire contents of which is incorporated herein by reference.

The specific zeolites described, when prepared in the presence of organic cations, are catalytically inactive, possibly because the intracrystalline free space is occupied by organic cations from the forming solution. They may be activated by heating in an inert atmosphere at 540° C. (1000° F.) for one hour, for example, followed by base exchange with ammonium salts followed by calcination at 540° C. (1000° F.) in air. The presence of organic cation in the forming solution may not be absolutely essential to the formation of this type zeolite; however, the presence of these cations does appear to favor the formation of this special type catalyst by base exchange with ammonium salts followed by calcination in air at about 540° C. (1000° F.) for from about 15 minutes to about 24 hours.

Natural zeolites may sometimes be converted to this type zeolite catalyst by various activation procedures and other treatments such as base exchange, steaming, alumina extraction and calcination, in combinations. Natural minerals which may be so treated include ferrierite, brewsterite, stilbite, dachiardite, epistilbite, heulandite, and clinoptilolite. The preferred crystalline zeolites are ZSM-5, ZSM-11, ZSM-12, ZSM-23, ZSM-35 and ZSM-38 with ZSM-5 particularly preferred.

In a preferred aspect of this invention, the zeolites hereof are selected as those having a crystal framework density, in the dry hydrogen form, of not substantially below about 1.6 grams per cubic centimeter. It has been found that zeolites which satisfy all three of these criteria are most desired. Therefore, the preferred zeolites of this invention are those having a constraint index, as defined above of about 1 to about 12, a silica to alumina mole ratio of at least about 12 and a dried crystal density of not less than about 1.6 grams per cubic centimeter. The dry density for known structures may be calculated from the number of silicon plus aluminum atoms per 100 cubic Angstroms, as given, e.g., on Page 19 of the article on Zeolite Structure by W. M. Meier. This paper, the entire contents of which are incorporated herein by reference, is included in "Proceedings of the Conference on Molecular Sieves, London, April 1967", published by the Society of Chemical Industry, London, 1968. When the crystal structure is unknown, the crystal framework density may be determined by classical pycnometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density, of course, must be associated with a relative small amount of free space within the crystal, which might be expected to result in more stable structures. This free space, however, is important as the locus of catalytic activity.

Crystal framework densities of some typical zeolites are:

| Zeolite | Void Volume | Framework Density |
|---|---|---|
| Ferrierite | 0.28 cc/cc | 1.76 g/cc |
| Mordenite | .28 | 1.7 |
| ZSM-5-11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammoniun ion exchange and calcination of ammonium form to yield the hydrogen form. In addition to the hydrogen form, other forms of the zeolite wherein the original alkali metal has been reduced to less than about 1.5 percent by weight may be used. Thus, the original alkali metal of the zeolite or introduced hydrogen cations may be replaced by ion exchange with other suitable ions of Groups IB to VIII of the Periodic Table, including, by way of example, nickel, cadmium, copper, zinc, palladium, calcium or rare earth metals.

In practicing the desired method, it may be desirable to incorporate the above-described crystalline zeolite in another material resistant to the temperature and other conditions employed in the process. Such matrix materials include synthetic or naturally occurring substances as well as inorganic materials such as clay, silica and/or metal oxides. The latter may be either naturally occurring or in the form of gelatinous precipitates or gels including mixtures of silica and metal oxides. Naturally occurring clays, which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in a raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-berylia, silica-titania as well as ternary compositions, such as silica-alumina-thoria, silica-alumina-zirconia, silica-alumina-magnesia and silica-magnesia-zirconia. The matrix may be in the form of a cogel. The relative proporations of zeolite component and inorganic oxide gel matrix may vary widely with the zeolite content ranging from between about 1 to about 99 percent by weight and more usually in the range of about 5 to about 80 percent by weight of the composite.

The degree of zeolite acid activity of zeolite catalysts can be measured and compared by means of "alpha value" ($\alpha$). The alpha value reflects the relative activity of the catalyst with respect to a high activity silica-alumina cracking catalyst. To determine the alpha value as such term is used herein, n-hexane conversion is determined at a suitable temperature between about 290° C.-540° C. (550° F.-1000° F.), preferably at 540° C.

(1000° F.). Conversion is varied by variation in space velocity such that a conversion level of up to about 60 percent of n-hexane is obtained and converted to a rate constant per unit volume of zeolite and compared with that of silica-alumina catalyst which is normalized to a reference activity of 540° C. (1000° F.). Catalytic activity of the catalysts are expressed as multiple of this standard, i.e. the silica-alumina standard. The silica-alumina reference catalyst contains about 10 weight percent $Al_2O_3$ and the remainder $SiO_2$. This method of determining alpha, modified as described above, is more fully described in the Journal of Catalysis, Vol. VI, pages 278–287, 1966. The catalyst of the present invention has a zeolite catalyst activity (as measured without the presence of the hydrogenation component) in terms of alpha value of between about 25 and 200, and preferably of between about 50 and 125.

The attainment of a desired alpha value for a zeolite can be accomplished by a number of means, or a combination of such means. One method to reduce alpha value of an active (acid) form of the zeolite is by steaming. Alternatively, reduction of acid activity and hence alpha value of a zeolite can be reduced by ion exchange with sodium or other alkali metal. Alpha value will also be reduced by increasing the silica to alumina mole ratio. In order to obtain a particular alpha value it may be desirable in some instances to use a zeolite with a high silica to alumina mole ratio in conjunction with steam treatment.

The nickel-tungsten hydrogenation component and the zeolite component of the catalyst of the present invention are in intimate contact with one another. They are not merely mixed together. One method in which such intimate contact can be attained is by impregnation of the hydrogenation component. Pellets of the hydrogen form zeolite, for example, may be impregnated with aqueous solutions of ammonium metatungstate and nickel nitrate to associate the zeolite with the hydrogenation component. Impregnation can occur during one course of making catalyst extrudate, or after the extrudate is formed. The nickel and tungsten can be added together during such impregnation, or alternatively the tungsten can be added in the muller, with the nickel added after the extrudate is formed.

Feedstocks for this invention are polynuclear aromatic containing liquids derived from such sources as petroleum, coal, shale oil, tar sands, etc. Particularly suitable feedstocks for the present invention comprise refractory stocks such as FCC cycle oil and also the products of coal liquefaction processes.

Highly aromatic petroleum liquids are suitable feedstocks for this invention. Heavy aromatic, high sulfur content crudes make up an increasing fraction of today's refinery feeds. This trend towards less desirable refinery feed is very likely to continue in the near future. Furthermore, refinery by-product liquids such as FCC clarified slurry oil and FCC cycle oil can be hydrocracked in accordance with this invention to produce significant amounts of gasoline and diesel fuel.

Products from the liquefaction of coal are generally highly aromatic and thus would be prime feedstocks for the novel hydrocracking process of the present invention. Coal is liquefied by exposing it to hydrogen gas or a hydrogen-bearing solvent under pressure and, in many processes, in the presence of a catalyst. Temperatures are generally kept below 480° C. (900° F.) so that the hydrocarbons are not converted to coke and gaseous products. Alternatively, coal can be destructively distilled by heating in such a way that its volatile components are given off and can then be condensed as a liquid. The net result is an increased hydrogen/carbon ratio in the liquid products. Hydrogen is generated by gasifying a portion of the coal, or of a coal residue in most schemes, and this is a substantial portion of the cost of liquefaction. Sulfur content of the coal is also an important constraint, since hydrogen is also needed to remove this contaminant (as hydrogen sulfide gas), in proportion to the amount of sulfur present. In theory, it is somewhat easier and cheaper to make a heavy oil from coal suitable for a boiler fuel than a synthetic crude oil that can be refined to gasoline, since the crude oil product requires adding about twice as much hydrogen—between 5 and 10 percent of the coal's weight. Boiler fuels may also have an economic advantage in that they would supply a regulated market—the electric utility industry that now generates about 30 percent of its power with oil and natural gas—making commercial introduction somewhat easier.

The three direct general processes for converting coals to liquid fuels are: catalyzed hydrogenation, staged pyrolysis, and solvent refining. Each of these processes results in the production of a coal liquid which contains a variety of desirable and undesirable components. The desirable coal liquids are the oils (saturated and aromatic hydrocarbons) and the resins.

The undesirable species are the asphaltenes and the carbenes (high molecular weight highly aromatic solids) and the carboids (polymerized coke-like materials). The undesirable elements are the metals, sulfur, nitrogen, and oxygen which are generally present in higher concentration in the asphaltene and carboid fractions. Under hydrogenolysis conditions, the conversion of coal to oil has been suggested to proceed via the following sequence: Coal→Asphaltene→Oil. Therefore, asphaltene generation and elimination are of great importance in the liquefaction process.

One example of a typical coal liquefaction process is the Solvent Refined Coal (SRC) process, which is a method of dissolving coal to remove its ash, reduce its sulfur content and lower its average molecular weight. Pulverized coal is mixed with a solvent and hydrogen and heated until most of it dissolves. Gases including hydrogen sulfide are removed, as are ash and other undissolved solids. A fraction of the remaining liquid is recycled as the solvent, and the rest is product, a low-sulfur boiler fuel that is solid at room temperature but melts readily at about 190° C. (375° F.). It is the light organic liquid derived from the Solvent Refined Coal (SRC) process that can be a feedstock for this invention.

Another coal liquefaction process is the H-Coal process. In this process, coal is converted to oil by direct hydrogenation. The sequence of processing steps is essentially the same as in solvent refining except that the mixture of finely ground coal, recycle oil, and hydrogen are reacted in the presence of a catalyst. The process can produce either synthetic crude oil or, by lowering the reaction temperature and adding less hydrogen, a heavy-oil boiler fuel. The synthoil process is similar to H-Coal in that it is also a catalytic process.

Still another coal liquefaction process is the Donor Solvent process. This process differs from H-Coal in that hydrogenation of the coal is carried out indirectly, through a solvent that transfers hydrogen to the coal while extracting a liquid product.

In comparison with conventional petroleum feedstocks and residua coal liquids generally exhibit slightly higher carbon content, but significantly lower hydrogen content. Recent data suggests both a higher degree of aromaticity and a more highly condensed ring structure for coal liquids than for conventional petroleum type liquids.

A more striking difference between the coal liquids and conventional petroleum type liquids is the heteroatom content. Nitrogen and oxygen levels in coal liquids are generally much higher than in petroleum, but sulfur is somewhat lower. Furthermore, 40–70 wt. % of the nitrogen in coal liquids is basic in character compared to 25–30 wt. % for typical conventional petroleum stocks.

The aromaticity of a particular feedstock can be expressed as "% $C_A$". The "% $C_A$" is defined as the percent of carbon atoms which are present in aromatic rings based on the total amount of carbon atoms and is given by the formula:

$$\% \ C_A \frac{C \text{ Atoms in Aromatic Rings}}{\text{Total } C \text{ Atoms}} \times 100\%$$

The % $C_A$ for representative compounds are as follows:

| | | |
|---|---|---|
| Benzene |  | % $C_A$ = 100% |
| Toluene |  | % $C_A$ = 85.7% |
| Xylene |  | % $C_A$ = 75% |

Liquid feeds that would be amenable to this invention would have an aromaticity as expressed in % $C_A$ in a range between about 30% and 100% and preferably between about 40% and 100%.

Aromaticity is a function of boiling point. This is clearly shown in Table 1 which gives properties, including % $C_A$, for various petroleum components.

Table 2 gives aromaticities for various coal liquids and petroleum residua. It can be seen from Table 2 that the % $C_A$ for coal derived liquids range from between about 50% and 80%, while the % $C_A$ for petroleum residua ranges from between about 20% and 35%.

The aromatic feedstock of this invention must be further characterized by having a majority of its aromaticity in "polynuclear aromatics". Polynuclear aromatics are aromatic compounds having three or more connected aromatic rings, such as anthracene, phenanthrene, chrysene, etc.

TABLE 2

AROMATICITIES OF COAL LIQUIDS AND PETROLEUM RESIDUA DETERMINED BY C13 NMR SPECTROSCOPY

| | % $C_A$ (Atom %) | C/H (Atom Ratio) |
|---|---|---|
| SRC type I from Illinois No. 6 Coal | 77 | 1.29 |
| S'RC Recycle Solvent | 70 | 0.970 |
| Synthoil from Illinois No. 6 Coal | 61 | 0.922 |
| H-Coal from Illinois No. 6 Coal (fuel oil mode) | 63 | 0.940 |
| Petroleum No. 6 Fuel Oil | 24 | 0.647 |
| Mid-Continent Vacuum Residuum | 19 | 0.600 |
| West Texas Sour Vacuum Residuum | 34 | 0.706 |

Large amounts of sulfur, nitrogen and oxygen (high heteroatom content) generally decrease the overall efficiency of processing catalysts. Therefore the removal of such contaminants or the ability to tolerate same is very important in the production of high quality fuels from the aforesaid feedstocks. Whereas hydrocracking typically involves both a pretreating catalyst to remove heteroatoms such as nitrogen and sulfur and a cracking catalyst to produce valuable liquid fuels, the catalyst of the instant invention can in many instances perform both functions. Thus the need for pretreatment may be reduced, or totally eliminated.

The catalyst utilized in the instant invention is particularly nitrogen sensitive and acts to reduce nitrogen and sulfur contents while increasing hydrogen content and saturating a substantial amount of polynuclear aromatics. CCR reduction is also possible with this catalyst. The novel process of this invention will also afford operation at much lower pressures required for conventional hydrocracking, e.g. operation at about 74 kg/cm² gage (1050 psig) rather than 106 kg./cm² gage (1500 psig) with concomitant lower hydrogen consumption while still producing significant amounts of gasoline and high quality diesel fuels.

Hydrocracking in accordance with the present invention is conducted at a temperature of between about 205° C. (400° F.) and 510° C. (950° F.) preferably between about 260° C. (500° F.) and 425° C. (800° F.), a pressure of between about 7 kg./cm² gage (100 psig) and 141 kg./cm² gage (2000 psig) preferably between about 28 kg./cm² gage (400 psig) and 105 kg./cm² gage (1500 psig), a liquid hourly space velocity (LHSV), i.e. the liquid volume of hydrocarbon per hour per volume of catalyst, of between about 0.1 and 10, and a molar ratio of hydrogen to hydrocarbon charge of between about 2 and 80, preferably between about 5 and 50.

TABLE 1

AROMATICITY OF PETROLEUM COMPONENTS

| | FCC Light Gasoline | FCC Light Cycle Oil | FCC Clarified Slurry Oil | Coker Light Gas Oil | Coker Heavy Gas Oil |
|---|---|---|---|---|---|
| Gravity, °API | 47.9 | 17.4 | 0.3 | 33.1 | 21.6 |
| Hydrogen, Wt. % | 12.68 | 9.80 | 7.97 | 12.74 | 11.28 |
| Nitrogen, Wt. % | 0.031 | 0.25 | 0.41 | 0.30 | 0.76 |
| Aromaticity, % $C_A$ | 36 | 54 | 70 | 23 | 38 |
| Distillation (D-2887), °F. | | | | | |
| 5% | 79 | 398 | 576 | 346 | 469 |
| 50% | 274 | 523 | 727 | 459 | 597 |
| 95% | 404 | 677 | 863 | 543 | 686 |

The process of this invention may be carried out in equipment suitable for catalytic operations. The process may be operated batchwise. It is preferable, however, and generally more feasible, to operate continuously. Accordingly, the process is adapted to operations using a fixed bed of catalyst. Also the process can be operated using a moving bed of catalyst wherein the hydrocarbon flow may be concurrent or countercurrent to the catalyst flow. A fluid type of operation may also be employed with the catalyst described herein. After hydrocracking the resulting products may be suitable separated from the remaining components by conventional means such as adsorption, distillation, etc. Also the catalyst, after use over an extended period of time, may be regenerated with hydrogen or in accordance with conventional procedures by burning off carbonaceous deposits from the surface of the catalyst in an oxygen containing atmosphere under the conditions of elevated temperature.

The following examples will serve to illustrate the invention without limiting same.

EXAMPLE 1

This example illustrates the preparation of a catalyst useful in this invention.

A mixture of 65 wt. % ZSM-5 having a crystallite size of less than 0.05 microns and 35 wt. % alumina on an anhydrous basis was extruded to form 1/16 inch pellets. The pellets were calcined at 540° C. (1000° F.) in nitrogen, ammonium exchanged, and then calcined in air.

100 grams of the air-calcined extrudate was impregnated with 13.35 grams of ammonium matatungstate (73.3% W) in 60 cc of water, followed by drying at 240° C. and calcination in air at 540° C. (1000° F.). The extrudate was then impregnated with 15.06 grams of nickel hexahydrate in 60 cc of water, and the wet pellets dried and again calcined in air at 540° C. (1000° F.).

The final catalyst had a calculated nickel content of about 1.7 wt. % as NiO, a calculated tungsten content of about 10.5 wt. % as $WO_3$, 57.1 wt. % ZSM-5 and 30.7 wt. % alumina.

EXAMPLES 2-4

In examples 2-3, an FCC Light Cycle Oil chargestock was contacted with the catalyst of Example 1. In Example 4, the aforesaid chargestock was contacted with a commercial CHD catalyst. The results for Examples 2-4 are given in Table 3. The properties of the FCC Light Cycle Oil Chargestock are as follows:

| | |
|---|---|
| Gravity, °API | 16.1 |
| Sulfur, wt. % | 3.19 |
| Hydrogen, wt. % | 9.89 |
| Nitrogen, wt. % | .0705 |
| Wt. % Compound Type Analysis (400+) | |
| Paraffins | 17.3 |
| Naphthenes | 13.3 |
| Mono Aromatics | 10.0 |
| Poly Aromatics | 59.4 |

In comparing the results of the catalyst utilized in this invention (Examples 2-3) to a commercial CHD catalyst (Example 4), it is readily seen that the catalyst utilized in the present invention exhibits superior denitrogenation and desulfurization capabilities and a much greater conversion of polynuclear aromatics.

The results for Example 2 show a nitrogen reduction of from 705 ppm to 14 ppm, a sulfur reduction of from 3.19 wt. % to 0.12 wt. %, an increased hydrogen content from 9.89 wt. % to 12.12 wt. %, a polynuclear aromatics conversion to saturates, monoaromatics and gasoline of about 90% and a gasoline make of 26 vol. % on a single pass.

TABLE 3

HYDROCRACKING OF AN FCC LIGHT CYCLE OIL

| | EXAMPLE 2 | EXAMPLE 3 | EXAMPLE 4 |
|---|---|---|---|
| Days on Stream | 1.1 | 1.7 | — |
| Space velocity, LHSV | 0.49 | 0.89 | 3.0 |
| Temp., °F. | 707 | 694 | 600 |
| Pressure, psig $H_2$ | 1500 | 600 | 425 |
| $H_2$ Circulation, SCF/B | 9299 | 2936 | 1257 |
| Yields, Wt. % | | | |
| $H_2S + NH_3$ | 3.35 | 2.96 | 2.35 |
| $C_1-C_3$ | 2.56 | 4.89 | .01 |
| $C_4$ | 3.42 | 3.17 | 2.0 |
| $nC_4$ | 1.79 | 1.6 | 0.0 |
| $C_5^+$ | 93.24 | 90.35 | 98.25 |
| Yields, Vol. % | | | |
| $iC_4$ | 2.39 | 2.54 | 0 |
| $C_5$-180° F., Lt.Naphtha | 12 | 8 | 0 |
| 180° F.-390° F., Hvy Naphtha | 14 | 8 | 0 |
| $iC_4 + C_5^+$ yield | 103.5 | 97.0 | 100.98 |
| $H_2$ Consumption, SCF/B | 1642 | 875 | 384 |
| Product Properties | | | |
| Gravity, °API | 32.7 | 23.8 | 20.1 |
| Sulfur, wt. % | 0.12 | .49 | 1.01 |
| Hydrogen, wt. % | 12.12 | 10.75 | 10.54 |
| Nitrogen, wt. % | .0014 | .0386 | .0601 |
| % WT Cmpd Type Anal. (400+) | | | |
| Paraffins | 9.3 | 8.2 | 19.4 |
| Naphthenes | 21.0 | 11.3 | 11.9 |
| Mono Aromatics | 28.7 | 23.6 | 24.3 |
| Poly Aromatics | 6.0 | 29.9 | 44.4 |
| Total 400− Conversion | 35.0 | 27.0 | — |
| Selectivities | | | |
| (Wt. $C_1$-$C_3$)/Wt. Conv. | 7.31 | | |
| Wt. $nC_4$/wt. Conv. | 5.09 | | |
| Total | 12.4 | | |

What is claimed is:

1. A process for hydrocracking a polynuclear aromatic containing feedstock having a %$C_A$ within the range of from about 30% to about 100% which comprises contacting said feedstock under conversion conditions including a temperature of between about 400° F. and 950° F., a pressure of between about 100 psig and 2000 psig, a LHSV of between about 0.1 and 10, and a molar ratio of hydrogen to hydrocarbon charge of between about 2 and 80 with a catalyst comprising one or more members of a class of zeolites characterized by a silica to alumina mole ratio of at least 12, a constraint index in the approximate range of 1 to 12 and an alpha value of between about 25 and 200 and wherein said zeolite is in intimate contact with a nickel-tungsten hydrogenation component.

2. The process of claim 1 wherein said zeolite is ZSM-5, ZSM-11, ZSM-12, ZSM-23, ZSM-35, or ZSM-38.

3. The process of claim 2 wherein said zeolite is ZSM-5.

4. The process of claim 1 wherein said zeolite has a crystallite size of less than about 5 microns.

5. The process of claim 1 wherein said feedstock is FCC light cycle oil.

6. The process of claim 1 wherein said alpha value is between about 50 and 125.

7. The process of claim 1 wherein said intimate contact is attained by impregnation.

8. The process of claim 1 wherein said conversion conditions include a temperature of between about 500° F. and 800° F., a pressure of between about 400 psig and 1500 psig, a LHSV of between about 0.1 and 10, and a molar ratio of hydrogen to hydrocarbon charge of between about 5 and 50.

9. The process of claim 1 wherein said hydrogenation component consists of about 0.7 to about 7 wt. % nickel and about 2.1 to about 21 wt. % tungsten expressed as metal based on said catalyst.

10. The process of claim 1 wherein said zeolite is contained in an alumina matrix.

* * * * *

UNITED STATES PATENT AND TRADEMARK OFFICE
CERTIFICATE OF CORRECTION

PATENT NO. : 4,305,808
DATED : December 15, 1981
INVENTOR(S) : EMMERSON BOWES ET AL It is certified that error appears in the above—identified patent and that said Letters Patent is hereby corrected as shown below:

Column 2, Line 44    "catalyst" should be -- catalytic --

Column 11, Line 11   "suitable" should be -- suitably --

Signed and Sealed this

Seventeenth Day of August 1982

[SEAL]

Attest:

Attesting Officer

GERALD J. MOSSINGHOFF
Commissioner of Patents and Trademarks